United States Patent Office 3,488,734
Patented Jan. 6, 1970

3,488,734
PREPARATION OF 2-BROMO-2-CYANOACETAMIDE
George A. Burk, Bay City, Mich., assignor to The Dow Chemical Company, Midland, Mich., a corporation of Delaware
No Drawing. Filed July 3, 1967, Ser. No. 650,637
Int. Cl. C07c *121/16, 103/12*
U.S. Cl. 260—465.4                                      6 Claims

ABSTRACT OF THE DISCLOSURE 2-bromo-2-cyanoacetamide is prepared by adding an equivalent of bromine to a suspension of 2-cyanoacetamide in benzene, a lower alkylbenzene, or a halogenated lower aliphatic hydrocarbon at 20–120° C.

BACKGROUND OF THE INVENTION

This invention concerns a new chemical process. It concerns particularly a process whereby the compound 2-bromo-2-cyanoacetamide is selectively obtained by the direct reaction of bromine with 2-cyanoacetamide.

The monobrominated compound 2-bromo-2-cyanoacetamide, a useful chemical intermediate, has been obtainable in the past only by means of indirect syntheses or reactions with specialized brominating agents. Reported attempts to prepare this compound by direct reaction with bromine have yielded the corresponding dibrominated amide or other compounds formed by side reactions. Jackson et al. (J. Am. Chem. Soc. 55, 5001) claimed the production of 2-bromo-2-cyanoacetamide by reaction of an equivalent of bromine with 2-cyanoacetamide in acetic acid solution. However, the product had a melting point more consistent with that of bromomalonamide and the material has since been confirmed as being in fact the latter compound.

Known methods of synthesis include the reaction of dimethylaniline with the dibrominated amide to abstract an atom of bromine and the reaction of the dibrominated amide with 2-cyanoacetamide in the presence of a Friedel-Crafts catalyst. The monobromo compound has also been made by bromination with N-bromosuccinimide.

SUMMARY OF THE INVENTION

It has now been found that when about a mole equivalent of bromine is added to a suspension of 2-cyanoacetamide in benzene, a lower alkylated benzene, or a halogenated lower aliphatic hydrocarbon at 20–120° C., preferably 40–100° C., the bromination reaction takes place in a relatively short time to produce good yields of 2-bromo-2-cyanoacetamide to the substantial exclusion of the dibrominated amide. The reaction is carried out in the absence of a halogenation catalyst or halogen carrier. Since both the starting amide and the monobrominated product are substantially insoluble in this class of solvent, the product is easily separable from the reaction mixture by simple decantation or filtration. The crude product thereby obtained is ordinarily of better than 90 percent purity.

DETAILED DESCRIPTION

Preferred reaction media operable in the present process are halogenated saturated lower aliphatic hydrocarbons of 1–3 carbon atoms which are normally liquids, that is, they are liquid at ambient temperature. By halogen is meant the halogens of atomic number 9–35, fluorine, chlorine, and bromine. Preferably, the solvent or mixture of solvents has a boiling point of 40–100° C. Solvents such as chloroform, carbon tetrachloride, methylchloroform, ethylene dichloride, 1,1,2,2-tetrachloro-1,2-difluoroethane, and 1,1,2-trichloro-1,2,2-trifluoroethane are examples of preferred reaction media. Other suitable materials of this class are 1,2-dibromo-1,1,2,2-tetrafluoroethane, ethylidene dichloride, propylene dichloride, and methylene bromide. Mixtures of two or more of such solvents can be used.

Also operable in the process are benzene hydrocarbons of 6–10 carbon atoms including benzene and lower alkylbenzenes such as toluene, xylene, mesitylene, ethylbenzene and the like. These may also be used in admixture with each other or with halogenated solvents as described above. Benzene and toluene are preferred members of this class.

The proportion of reaction medium is not critical. Preferably, enough solvent is used to make an easily stirred suspension. Conveniently, the boiling point of the solvent is within the preferred reaction temperature range and the reaction can be run at the reflux temperature to maintain a more or less constant temperature while the boiling of the solvent supplies at least part of the agitation of the reaction mixture.

Example 1

A slurry of 42 g. of cyanoacetamide in 400 ml. of carbon tetrachloride was stirred at the reflux temperature of 76° C. To the stirred slurry there was added 80 g. of bromine dropwise over a period of 30 minutes. About half of the carbon tetrachloride was flash distilled from the mixture and the suspended solid was collected on a filter. The air dried product was a yellow solid, weight 80 g., melting point 90–103° C. Infrared spectroscopic analysis indicated that this was 2-bromo-2-cyanoacetamide of about 95% purity. It was crystallized from absolute alcohol to obtain the pure compound as cream colored needle-like crystals with a final melting point of 113° C.

Evaporation of the carbon tetrachloride filtrate from the separation of the crude reaction product yielded 3 g. of crystals identified as largely 2,2-dibromo-2-cyanoacetamide.

Example 2

In a larger scale preparation, a slurry of 336 g. of 2-cyanoacetamide in 2400 ml. of carbon tetrachloride was stirred at reflux temperature while 640 g. of bromine was added dropwise over six hours. A two-phase liquid system formed during the course of the reaction, then the lower layer began to form solid agglomerates and the layer finally solidified completely. The solid product was broken up and a sample was recrystallized from methanol to obtain 2-bromo-2-cyanoacetamide in about 81 percent yield as a yellow crystalline solid with a final melting point of 105° C. Recrystallization of the crude from absolute ethyl alcohol provided a somewhat lower yield of a slightly purer grade of the compound as in Example 1.

Example 3

The procedure of Example 1 was repeated using chloroform as the reaction medium. Because of the lower reflux temeprature of chloroform, a longer reaction period of two hours was required for complete reaction. The chloroform was decanted from the solid product to obtain 84 g. of 2-bromo-2-cyanoacetamide as a yellow crystalline solid. The purity of this material was similar to that of the crude products of Examples 1 and 2.

Example 4

A slurry of 21 g. of 2-cyanoacetamide in 350 ml. of refluxing benzene was stirred while 0.25 g. mole of bromine was added dropwise over about one half hour. A heavy brown product layer separated from the reaction mixture. Upon drawing off this product layer and cooling, the layer solidified to yield 25 g. of brown crystalline solid identified as crude 2-bromo-2-cyanoacetamide. This crude product was recrystallized from methanol and from acetone to obtain 14 g. of crystalline 2-bromo-2-cyanoacetamide melting at 105–108° C. The benzene layer from the reaction mixture was evaporated to obtain an additional 8 g. of crystalline 2-bromo-2-cyanoacetamide melting at 113–114° C.

Similar results are obtained when the procedure of Example 4 is repeated using toluene, xylene, or other such alkylbenzene as the reaction medium in place of benzene.

When the general procedure of the above examples was repeated using water, dioxane, or glacial acetic acid as the reaction medium, no significant amount of monobromocyanoacetamide was found in the respective reaction products. Addition of a mole of bromine to a mole of cyanoacetamide in water yielded a mixture of dibromocyanoacetamide and unreacted cyanoacetamide. No bromocyanoacetamide could be isolated from the dioxane reaction mixture. The same procedure carried out in a glacial acetic acid reaction medium produced a crude product melting at about 177° C. and identified by infrared spectroscopic analysis as monobromomalonamide. No bromocyanoacetamide was found.

I claim:
1. A process for making 2-bromo-2-cyanoacetamide which comprises adding about one mole of bromine to a mixture which consists essentially of one mole of 2-cyanoacetamide and a reaction medium which is at least one of benezene, a lower alkylated benzene, and a halogenated saturated lower aliphatic hydrocarbon which is liquid at ambient temperature and wherein halogen is fluorine, chlorine, or bromine, at a temperature of 20–120° C. and maintaining the mixture at said temperature until the bromination reaction is substantially complete.

2. The process of claim 1 wherein the temperature is 40–100° C.

3. The process of claim 2 wherein the reaction medium is a halogenated hydrocarbon having a boiling point of 40–100° C.

4. The process of claim 3 wherein the halogenated hydrocarbon is carbon tetrachloride.

5. The process of claim 3 wherein the halogenated hydrocarbon is chloroform.

6. The process of claim 1 wherein the reaction medium is benzene.

References Cited

UNITED STATES PATENTS 3,403,174    9/1968    Chance et al. _____ 260—465.4

OTHER REFERENCES

Asahi, C. A., vol. 62, page 11695 (1965).

JOSEPH P. BRUST, Primary Examiner

U.S. Cl. X.R.

260—561